(Model.)
2 Sheets—Sheet 1.
H. A. ROBERTSON.
CULTIVATOR.
No. 256,374.
Patented Apr. 11, 1882.
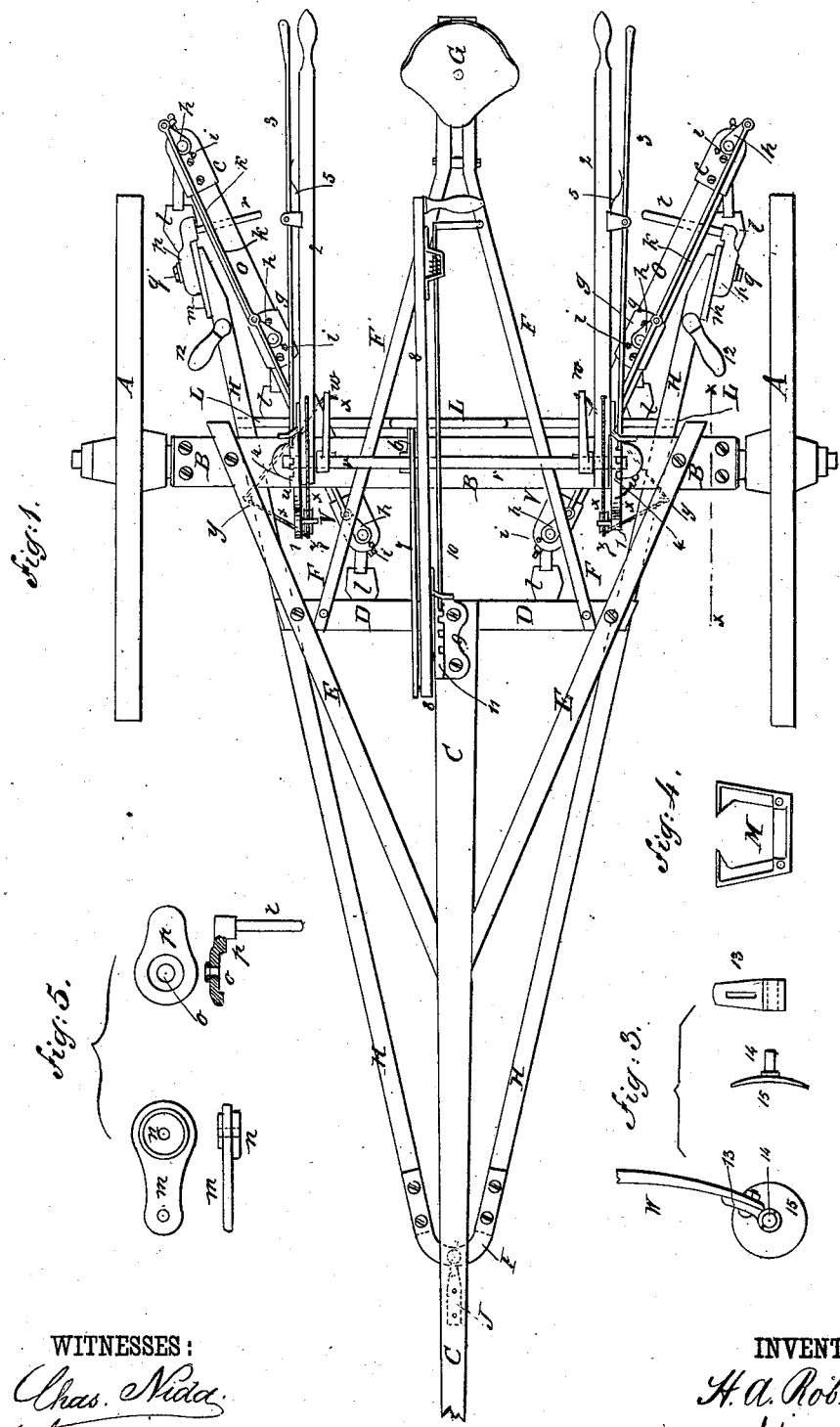
WITNESSES:
Chas. Nidd.
C. Sedgwick
INVENTOR:
H. A. Robertson
BY Munn & Co.
ATTORNEYS.

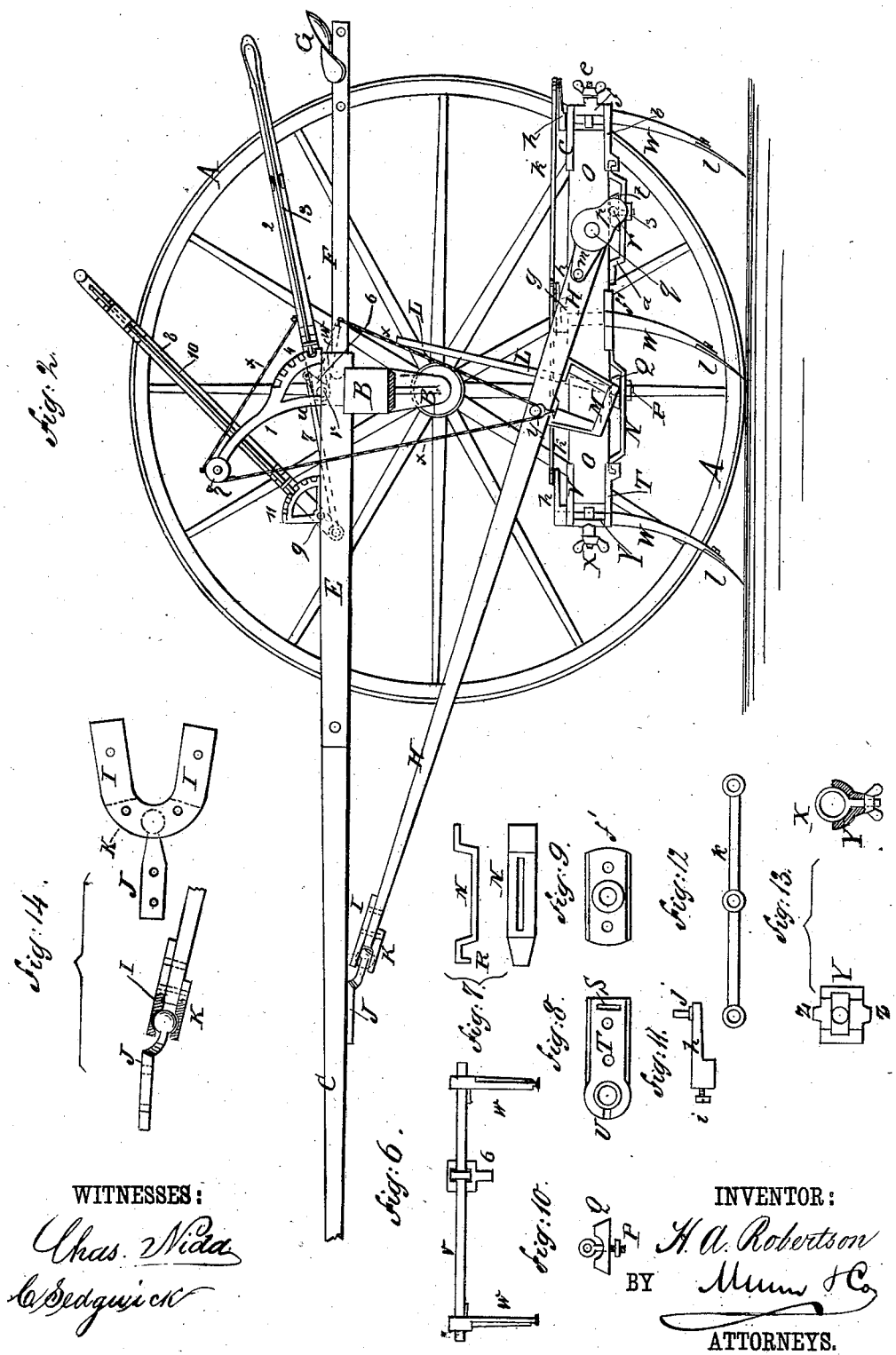

UNITED STATES PATENT OFFICE.

HENRY A. ROBERTSON, OF HASKINS, OHIO.

CULTIVATOR.

SPECIFICATION forming part of Letters Patent No. 256,374, dated April 11, 1882.

Application filed August 31, 1881. (Model.)

*To all whom it may concern:*

Be it known that I, HENRY A. ROBERTSON, of Haskins, in the county of Wood and State of Ohio, have invented certain new and useful Improvements in Cultivators, of which the following is a specification.

Reference is to be had to the accompanying drawings, forming part of this specification, in which similar letters of reference indicate corresponding parts in all the figures.

Figure 1, Sheet 1, is a plan view of my improvement. Fig. 2, Sheet 2, is a side elevation of the same, partly in section. Figs. 3 to 14, inclusive, represent various parts of the improvement in detail.

The object of this invention is to facilitate the controlling and adjusting of various parts of wheel-cultivators.

A represents the wheels, the axle B of which is arched or has its arms bent twice at right angles to form space for the auxiliary frame and to prevent the frame from striking and injuring the plants.

C is the tongue, to the rear end of which is attached a short cross-bar, D. The ends of the cross-bar D are attached to the inclined bars or braces E, the forward ends of which are attached to the opposite sides of the tongue C. The rear ends of the inclined bars or braces E are attached to the axle B at or near its upper angles. The axle B, tongue C, and bars D E form the main or carriage frame of the cultivator. To the axle B and cross-bar D is attached the forked forward end of the bar F, to the rear end of which is attached the driver's seat G.

H are two inclined bars, which, in connection with the plow-beams, form the auxiliary or draw frame of the cultivator. The bars H are placed with their rear ends projecting in the rear of the axle B and near the inner sides of the rear parts of the wheels A. The forward ends of the bars H incline toward each other and nearly meet beneath the middle part of the tongue C, where they are connected by a bar or plate, I, which has a semi-spherical recess formed in its middle part to receive and fit upon the ball formed upon the end of an arm or bracket, J, attached to the under side of the tongue C. The ball of the arm J is held in the recess of the plate I by a plate, K, bolted to the plate I, and having a corresponding semi-spherical recess formed in it to receive and fit upon the other side of the said ball. The ball of the arm J and the recessed plates I K thus form a ball-and-socket joint to allow the auxiliary frame of the cultivator to move freely in any direction.

L is a rod or bar, the end parts of which are horizontal, and its inner part is arched to allow it to pass over tall plants without injuring them. The ends of the bar L are bent forward, and are bolted to the inner sides of the lower parts of the hangers M, the upper parts of which are bolted to the inclined draw-bars H beneath or a little in the rear of the axle B. The horizontal parts of the arched bar L pass through keepers N, attached to the lower sides of the forward parts of the plow-beams O. The keepers N are slotted longitudinally to receive the eyebolts P, through the eyes of which the horizontal parts of the arched bar L pass. The eyebolts P also pass through the blocks Q, interposed between the keepers N and the plow-beams O, and which are recessed upon the upper sides, as shown in Fig. 10, to receive the eyes of the eyebolts P and the horizontal parts of the arched bar L, so that the plow-beams O can be securely clamped to the said arched bar L.

The forward ends, R, of the keepers N are bent downward, as shown in Fig. 7 and in dotted lines in Fig. 2, to enter recesses or grooves S, formed across the inner side of the inner end of the bearing-plate T, secured to the lower side of the forward end of each plow-beam O. The bearing-plate T has a longitudinal groove, U, in the inner side of its forward end, as shown in Fig. 8. A similar bearing-plate, V, except that it has no cross-groove in its rear end, is attached to the upper side of forward end of the beam O. The forward ends of the bearing-plates T V project beyond the forward ends of the plow-beams O, and are perforated to receive the forward plow-standard W. The standard W passes through the eye of an eyebolt, X, placed between the projecting forward ends of the bearing-plates T V, and through a block, Y, also placed between the ends of the said bearing-plates T V. The block Y is recessed upon its inner side to receive the eye of the eyebolt X and the standard W, and has ribs Z upon its lower and upper sides to enter the grooves U of the bearing-plates T V to hold the said block from turning in its seat. By this construction the standard W will be held firmly in place, and can be readily adjusted by loosening the eyebolt X.

To the rear part of the plow-beam O is secured a keeper, $a$, and bearing-plates $b$ $c$, which are made exactly like the keeper N and bearing-plates T V. The projecting ends of the bearing-plates $b$ $c$ are provided with an eyebolt, $e$, and a clamping-block, $f$, in the same manner as the bearing-plates T V, for securing the rear plow-standard W in place.

To the lower and upper sides of the center of each plow-beam O are attached bearing-plates $f'$ $g$, which are made without any grooves and with central perforations to receive the central plow-standard W. The bearing-plates T V, $b$ $c$, and $f'$ $g$ are all made with flanges along their side edges to keep them in place upon the plow-beams. Upon the upper ends of the plow-standards W are placed cranks $h$, the hubs of which rest upon the upper bearing-plates, V $c$ $g$, and are secured to the standards W by set-screws $i$, so that the position of the said cranks $h$ can be readily adjusted when desired.

The cranks $h$ of each beam are placed parallel with each other, and have upwardly-projecting pins $j$ attached to or formed upon their outer ends, which pass through and work in holes in the ends and center of the bars $k$, which thus connect the said cranks and keep them always parallel with each other. With this construction, by loosening the eyebolts X $e$ and moving the bars $k$ forward or rearward all the plow-standards W of each beam can be turned at the same time to adjust the plows $l$, attached to the lower ends of the said standards, as the positions of the beams O and the work to be done may require.

To the outer side of the rear end of each inclined bar H is bolted a plate, $m$, upon the outer side of the rear end of which is formed a circular projection, $n$, which fits into a circular recess, $o$, in the inner side of the inner end of the base of the crank $p$, and forms a bearing for the said crank. The crank $p$ is secured in place upon the bearing-plate $m$ by a clamping-screw, $q$.

Upon the outer end of the crank $p$ is formed, or to it is attached, a pin, $r$, which passes through the keeper $a$, attached to the lower side of the rear part of the plow-beam O. The pin $r$ also passes through the eye of an eyebolt, $s$, which passes through a recessed clamping-block, $t$, and through the slot of the keeper $a$, so as to hold the said plow-beam when adjusted securely in place upon the pin $r$. With this construction, by loosening the nuts of the eyebolts P $s$ the plow-beams O can be adjusted nearer to or farther from each other, and at a greater or less inclination, as the distance apart of the rows of plants may require. With this construction, also, by loosening the nuts of the eyebolts P $s$ one of the plow-beams O can be moved back and the other forward, and their rear ends moved outward and their forward ends inward, to adjust the machine for use as a harrow for preparing the ground to receive seed, for covering seed sown broadcast, and for other ordinary harrowing. With this construction, by loosening the eyebolts X $e$ and the clamping-screw $q$ the rear end of the plow-beam O can be raised to level it, so that all the plows will work at the same depth, or adjust it at an inclination so that some of the plows will work deeper than the others.

To the axle B, at the inner sides of the rear ends of the inclined braces E, are attached two brackets, $u$, in bearings in which work the ends of a rod or shaft, $v$. To the rod $v$, at a little distance from the brackets $u$, are secured two arms, $w$, to the ends of which are attached the ends of the cords or chains $x$. The cords or chains $x$ pass around pulleys $y$, pivoted to the sides of the inclined bars H over pulleys $z$, pivoted to the arms 1, formed upon the brackets $u$, and their other ends are attached to the levers 2, the lower ends of which are pivoted to the rod $v$. The levers 2 are held in any position into which they may be adjusted by the catch-levers or pawls 3, pivoted to the said levers 2, and which engage with the teeth of the ratchet-bars 4, formed upon the brackets $u$.

Between the upper ends of the levers 2 3 is interposed a spring, 5, to hold the catch-lever 3 in gear with the ratchet-bars 4. Upon the middle part of the rod $v$ is formed, or to it is attached, an arm, 6, to the end of which is pivoted the rear end of a connecting-rod, 7. The forward end of the connecting-rod 7 is pivoted to the lower end of the lever 8, which is pivoted to the lower part of the bracket or support 9, attached to the tongue C.

The lever 8 is held in any position into which it may be adjusted by the pawl 10, which works in keepers attached to the lever 8, and engages with the teeth of a ratchet-bar, 11, formed upon or attached to the bracket or support 9. With this construction, by operating the lever 8 the rear ends of both the inclined draw-bars H, and with them the plow-beams O and the standards W, can be raised, raising the plows $l$ from the ground. By operating one of the levers 2 the rear end of one of the inclined draw-bars H and its plow-beam, plow-standards, and plows will be raised, and by operating both the levers 2 all the plows will be raised the same as when the lever 8 is operated.

To the rear parts of the inclined bars H are attached foot-rests 12, so that the driver can guide the plows with his feet in cultivating crooked rows and to avoid irregular hills.

When small plants are to be cultivated the plows $l$ are detached from the forward standards W, and to the said standards are secured by the same bolts that hold the said plows l the blocks 13, in the lower parts of which are formed bearings to receive the pivots 14, formed upon or attached to the centers of the circular plows 15. The circular plows 15 are concaved upon the forward sides, as shown in Fig. 3. With this construction, when the machine is drawn forward the concaved circular plows 15 loosen the soil and throw a small portion of soil around the plants. When the plants become larger the concaved circular plows 15 and their bearing-block 13 are detached and replaced by ordinary plows.

Having thus fully described my invention, I claim as new and desire to secure by Letters Patent—

1. The combination of the perforated and grooved bearing-plates T V, provided with forwardly-projecting ends, the standard W, the eyebolt X, and the ribbed recessed block Y, whereby the standard W may be readily adjusted, as specified.

2. In a cultivator, the combination, with the inclined draw-bars H and the plow-beams O, of the arched bar L, the hangers M, the slotted keepers N, and the clamping eyebolts and blocks P Q, substantially as herein shown and described, whereby the plow-beams are adjustably connected with the inclined draw-bars, as set forth.

3. In a cultivator, the combination, with the beams O and the plow-standards W, of the cranks h and the connecting-bars k, substantially as herein shown and described, whereby the plow-standards and plows of each beam will be held in corresponding positions, and can be adjusted at the same time, as set forth.

4. In a cultivator, the combination, with the inclined bars H and the plow-beams O, of the bearing-plates m, the cranks p, the keepers a, and the clamping eyebolts and blocks s t, substantially as herein shown and described, whereby the plow-beams can be readily leveled, as set forth.

5. In a cultivator, the combination, with the axle B, the tongue C, and the inclined draw-bars H, of the bearing-brackets u, having arms 1, the rod v, having arms w w 6, the levers 2 2, the connecting-rod 7 and lever 8, and the cords x, substantially as herein shown and described, whereby the inclined draw-bars and their plow-beams and plows can be raised together or separately, as set forth.

HENRY A. ROBERTSON.

Witnesses:
J. A. SPAFFORD,
JACOB HISER.